(12) United States Patent
Hasegawa et al.

(10) Patent No.: US 7,848,589 B2
(45) Date of Patent: Dec. 7, 2010

(54) METHOD AND APPARATUS FOR APPLYING EDGE ENHANCEMENT BASED ON IMAGE CHARACTERISTICS

(75) Inventors: Fumihiro Hasegawa, Tokyo (JP); Yukinaka Uchiyama, Chiba (JP)

(73) Assignee: Richoh Company, Ltd., Tokyo (JP)

( * ) Notice: Subject to any disclaimer, the term of this patent is extended or adjusted under 35 U.S.C. 154(b) by 1108 days.

(21) Appl. No.: 11/342,639

(22) Filed: Jan. 31, 2006

(65) Prior Publication Data

US 2006/0170979 A1    Aug. 3, 2006

(30) Foreign Application Priority Data

Feb. 1, 2005    (JP)    ............... 2005-025350
Feb. 3, 2005    (JP)    ............... 2005-027452

(51) Int. Cl.
*G06K 9/46*    (2006.01)
*G06T 7/00*    (2006.01)
*G06T 5/00*    (2006.01)

(52) U.S. Cl. .................. 382/266; 382/191; 382/239

(58) Field of Classification Search ................ 382/199, 382/266, 232, 239, 248, 250, 190, 191
See application file for complete search history.

(56) References Cited

U.S. PATENT DOCUMENTS

| | | | |
|---|---|---|---|
| 5,189,523 A * | 2/1993 | Sugiura et al. | ............... 358/300 |
| 5,825,937 A * | 10/1998 | Ohuchi et al. | ............... 382/261 |
| 6,266,102 B1 | 7/2001 | Azuma et al. | |
| 6,738,527 B2 * | 5/2004 | Kuwata et al. | ............... 382/266 |
| 2002/0122198 A1 | 9/2002 | Tsue et al. | |
| 2004/0114815 A1 * | 6/2004 | Shibaki et al. | ............... 382/233 |
| 2005/0180645 A1 | 8/2005 | Hasegawa et al. | |
| 2005/0201624 A1 | 9/2005 | Hara et al. | |

FOREIGN PATENT DOCUMENTS

| | | |
|---|---|---|
| JP | 63-003562 | 1/1988 |
| JP | 03-104380 | 5/1991 |
| JP | 06-020092 | 1/1994 |
| JP | 07-244725 | 9/1995 |
| JP | 08-163365 | 6/1996 |
| JP | 09-200499 | 7/1997 |
| JP | 2000-4379 A | 1/2000 |
| JP | 2001-211325 A | 8/2001 |
| JP | 2001-218015 A | 8/2001 |
| JP | 2001-251517 | 9/2001 |
| JP | 2001-292325 | 10/2001 |
| JP | 2002-083294 | 3/2002 |
| JP | 2002-112036 | 4/2002 |
| JP | 2002-262058 A | 9/2002 |
| JP | 2003-018403 | 1/2003 |
| JP | 2003-203232 A | 7/2003 |

OTHER PUBLICATIONS

Ho et al. "Classified Transform Coding Of Images Using Vector Quantization." 1989 International Conference on Acoustics, Speech, and Signal Processing, vol. 3, May 23, 1989, pp. 1890-1893.*
Frst page of Japanese Office Action for Application No. 2005-025350.

* cited by examiner

*Primary Examiner*—Jon Chang
(74) *Attorney, Agent, or Firm*—Dickstein Shapiro LLP

(57) ABSTRACT

An apparatus, method, system, computer program and product, capable of applying edge enhancement to an image based on characteristics of the image.

4 Claims, 17 Drawing Sheets

| RESOLUTION (dpi) R | THRESHOLD VALUE T |
|---|---|
| 1 ≦ R < 250 | 90 |
| 250 ≦ R < 450 | 30 |
| 450 ≦ R | 10 |
| 0 OR UNDEFINED | 40 |

| 0 | −1 | 0 |
|---|---|---|
| −1 | 5 | −1 |
| 0 | −1 | 0 |

| 0 | −2 | 0 |
|---|---|---|
| −2 | 9 | −2 |
| 0 | −2 | 0 |

FIG. 13
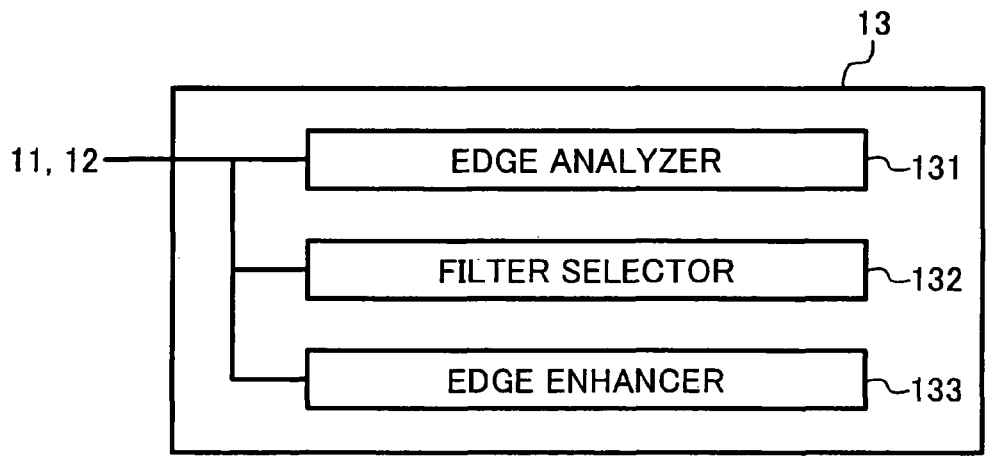
FIG. 14A  FIG. 14B
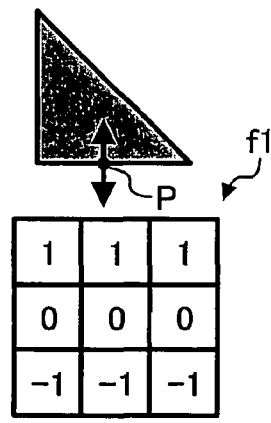 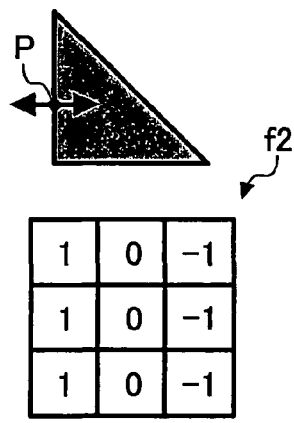
FIG. 14C  FIG. 14D  FIG. 14E
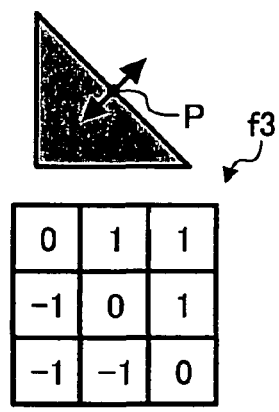 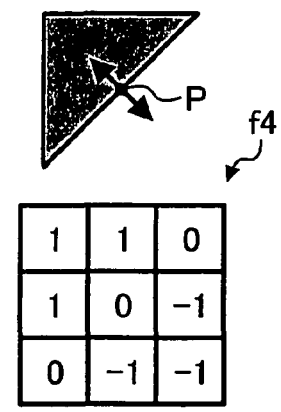 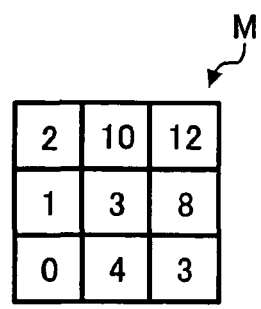

METHOD AND APPARATUS FOR APPLYING EDGE ENHANCEMENT BASED ON IMAGE CHARACTERISTICS

This patent application is based on and claims priority to Japanese patent application Nos. 2005-027452 filed on Feb. 3, 2005, and 2005-025350 filed on Feb. 1, 2005, in the Japanese Patent Office, the entire contents of which are hereby incorporated by reference.

FIELD OF THE INVENTION

The following disclosure relates generally to an apparatus, method, system and computer program and product, capable of applying edge enhancement to an image based on the characteristics of the image.

DESCRIPTION OF THE RELATED ART

Applying edge enhancement to an image can increase image quality, such as by improving apparent sharpness of the image. However, edge enhancement may sometimes cause the image quality to decrease. For example, if the image contains a smooth portion, such as a picture, a background section, or a shaded area, the image quality may be lowered as smoothness in the smooth portion decreases. In another example, if the image contains an edge portion having high edge intensity, the image quality may be lowered as graininess or noise in the edge portion increases.

BRIEF SUMMARY OF THE INVENTION

In light of the above-described and other problems, exemplary embodiments of the present invention provide an apparatus, method, system and computer program and product capable of applying edge enhancement to an image based on characteristics of the image.

In one example, once an original image is input, it is determined whether to apply edge enhancement to the original image based on characteristics of the original image to generate an edge detection result. Based on the edge detection result, edge enhancement is applied to the original image. Further, when the edge detection result indicates that edge enhancement should be applied, the characteristics of the original image may be further analyzed to generate an analyzing result. The analyzing result may be considered when applying edge enhancement to the original image.

BRIEF DESCRIPTION OF THE DRAWINGS

A more complete appreciation of the disclosure and many of the attendant advantages thereof are better understood by reference to the following detailed description in connection with the accompanying drawings, wherein:

FIG. 13 is the functional structure of an edge enhancer shown in FIG. 1 according to an exemplary embodiment of the present invention;

FIG. 14A is an illustration of an exemplary edge detection filter for the vertical direction;

FIG. 14B is an illustration of an exemplary edge detection filter for the horizontal direction;

FIG. 14C is an illustration of an exemplary edge detection filter for a first diagonal (the bottom left to the top right) direction;

FIG. 14D is an illustration of an exemplary edge detection filter for a second diagonal (the top left to the bottom right) direction;

FIG. 14E is an illustration of an exemplary target pixel and its surrounding pixels;

DETAILED DESCRIPTION OF THE INVENTION

Figure 1:
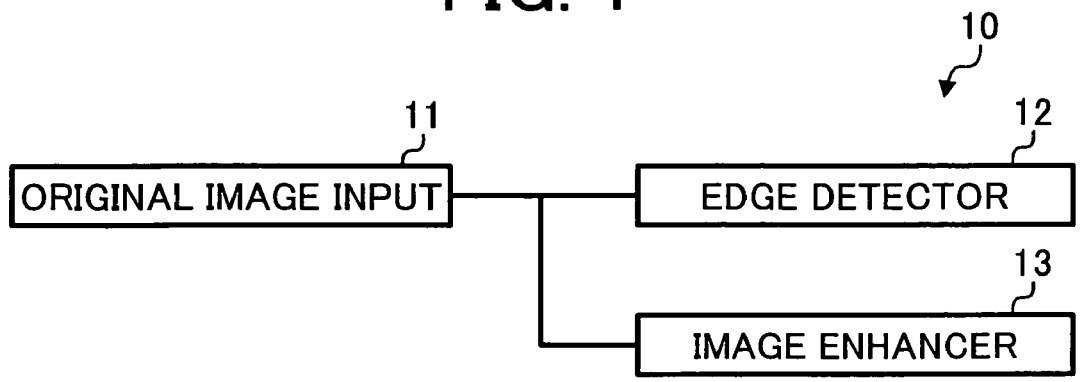
FIG. 1 is a schematic block diagram illustrating the functional structure of an image processing apparatus according to an exemplary embodiment of the present invention.

In describing the exemplary embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an image processing apparatus 10 according to an exemplary embodiment of the present invention. The image processing apparatus 10 is capable of applying edge enhancement to an image based on characteristics of the image.

As shown in FIG. 1, the image processing apparatus 10 includes an original image input 11, an edge detector 12, and an image enhancer 13.

The original image input 11 inputs an original image to be processed. For example, the original image input 11 may scan a printed image into image data using a scanner. In another example, the original image input 11 may obtain image data via a network. In another example, the original image input 11 may read image data from a storage device, which may be incorporated in the image processing apparatus 10. The input original image may be stored in a buffer of the image processing apparatus 10 further processing.

The edge detector 12 determines whether to apply edge enhancement to the original image based on the characteristics of the original image to generate an edge detection result. For example, the edge detector 12 may analyze a frequency domain of the original image to determine whether to apply edge enhancement to the original image.

The image enhancer 13 applies various image enhancement processes to the original image to enhance the quality of the original image. For example, the image enhancer 13 applies edge enhancement to the original image if the edge detection result indicates to apply edge enhancement. In this example, the image enhancer 13 may extract an edge portion from the original image and apply edge enhancement only to the edge portion of the original image, leaving the unextracted portion unprocessed. If the image enhancer 13 is provided with a smoothing function, the image enhancer 13 may apply smoothing to the unextracted portion.

Further, when applying edge enhancement, the image enhancer 13 may use a filter, which is selected based on the characteristics of the edge portion, such as the edge intensity or direction of the edge portion.

Figure 2:
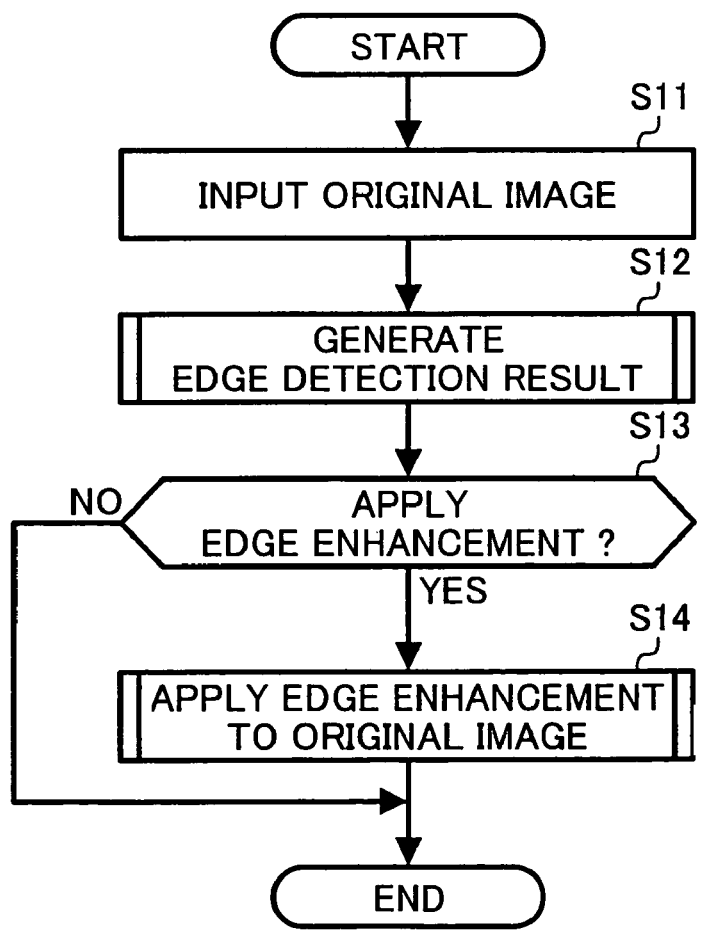
FIG. 2 is a flowchart illustrating the application of edge enhancement according to an exemplary embodiment of the present invention.

Referring now to FIG. 2, operation of applying edge enhancement to an original image, performed by the image processing apparatus 10, is explained according to an exemplary embodiment of the present invention.

Step S11 inputs an original image to be processed.

Step S12 generates an edge detection result based on characteristics of the original image, which indicates whether to apply edge enhancement to the original image.

Step S13 determines whether to apply edge enhancement based on the edge detection result. If the edge detection result indicates to apply edge enhancement ("YES" in Step S13), the operation proceeds to Step S14. If the edge detection result indicates that edge enhancement is not necessary ("NO" in Step S13), the operation ends to output the original image without applying edge enhancement.

Step S14 applies edge enhancement to the original image, such as to an edge portion of the original image.

Figure 3:
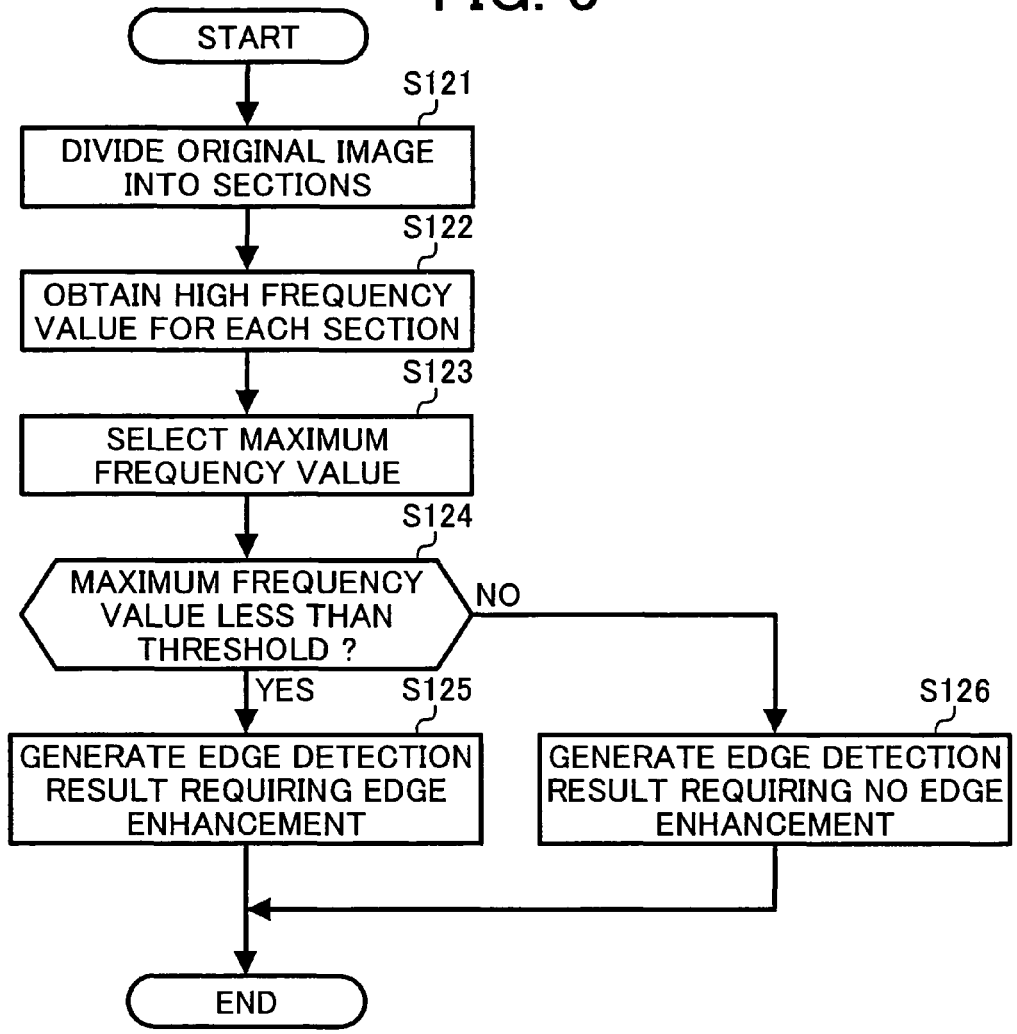
FIG. 3 is a flowchart illustrating the generation of an edge detection result according to an embodiment of the present invention.

Referring now to FIG. 3, Step S12 of generating an edge detection result is explained in more detail according to an exemplary embodiment of the present invention. In this example, the steps illustrated in FIG. 3 are performed by the edge detector 12 having the structure shown in FIG. 4.

Figure 4:
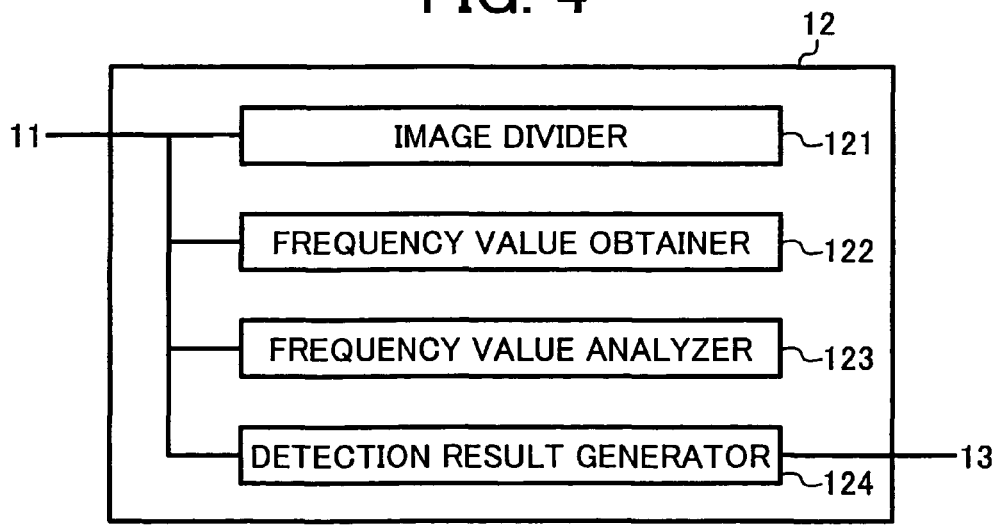
FIG. 4 is a schematic block diagram illustrating the functional structure of an image enhancer shown in FIG. 1 according to an exemplary embodiment of the present invention.

As shown in FIG. 4, the edge detector 12 includes an image divider 121, a frequency value obtainer 122, a frequency value analyzer 123, and a detection result generator 124. The image divider 121 divides an original image into a plurality of sections. The frequency value obtainer 122 obtains a high frequency value for at least one of the plurality of sections, by converting the original image from a spatial domain to a frequency domain. The frequency value analyzer 123 analyzes the high frequency value of the at least one section, which is obtained by the frequency value obtainer 122, to generate an analyzing result. The detection result generator 124 generates an edge detection result based on the analyzing result generated by the frequency value analyzer 123.

Figures 5, 6:
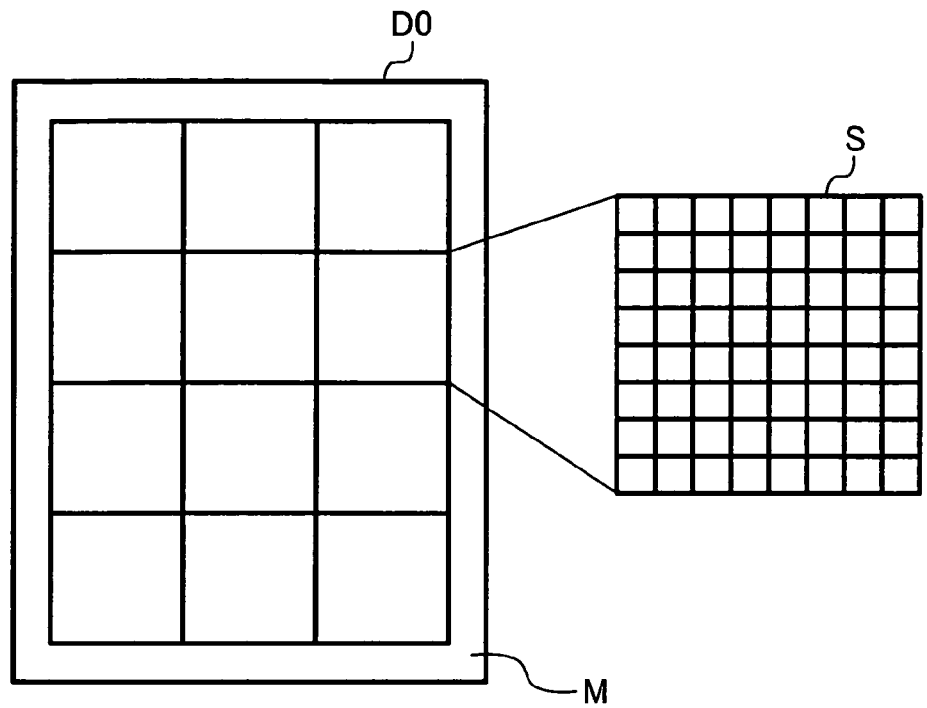
FIG. 5 is an illustration of dividing an original image according to an exemplary embodiment of the present invention.
FIG. 6 is a table illustrating the correspondence between a resolution of an original image and a threshold value according to an exemplary embodiment of the present invention.

Referring back to FIG. 3, Step S121 divides the original image into a plurality of sections. For example, if an original image D0 illustrated in FIG. 5 is input in Step S11 of FIG. 2, the image divider 121 of FIG. 4 divides the original image D0 into a plurality of sections S, each section S having 8 pixels by 8 pixels. Further, in this example, since the original image D0 contains a number of pixels which cannot be divided by 8, the original image D0 has at least one pixel not belonging to any one of the sections (indicated by "M" in FIG. 5). Alternatively, when the original image D0 contains a number of pixels which is not a multiple of 8, a copy of a last row or column of pixels may be added until the number of pixels becomes a multiple of 8.

Step S122 of FIG. 3 obtains a high frequency value F for each of the plurality of sections S. In this example, the frequency value obtainer 122 converts the pixel values contained in each section S to a discrete cosine transform (DCT) coefficient, which represents a high frequency component of each section S. For example, the frequency value obtainer 122 may extract the DCT coefficient located at (7, 7) as a high frequency value F, using the following equation:

$$F = \Sigma[i=0,7] \Sigma[j=0,7] f(i,j) * \cos\{(2*i+1)*7*\pi/16\} * \cos\{(2*j+1)*7*\pi/16\}$$

wherein f(i,j) corresponds to the pixel value of a pixel f located at (i,j) of the original image D0, corresponding in this instance to the DCT coefficient of the location (7,7). If the original image D0 of FIG. 5 is a color image having RGB (red, green, blue) components, the pixel value f(i,j) can be calculated by dividing the sum of the R value, the G value, and the B value.

Once a high frequency value F is obtained for each of the plurality of sections S, Step S123 of FIG. 3 selects a maximum frequency value Fmax from the high frequency values F, which has the highest absolute value. In this example, the maximum frequency value Fmax represents the characteristics of the original image D0, which may be used to determine whether to apply edge enhancement to the original image D0. For example, if the maximum frequency value Fmax is relatively large, the original image D0 has relatively high edge intensity values such that edge enhancement may not be necessary. If the maximum frequency value Fmax is relatively small, the original image D0 has relatively low edge intensity values such that edge enhancement may be necessary.

Step S124 determines whether the maximum frequency value Fmax is less than a threshold frequency value T. If the maximum frequency value Fmax is less than the threshold frequency value T ("YES" in Step S124), the operation proceeds to Step S125. If the maximum frequency value Fmax is equal to or greater than the threshold frequency value T ("NO" in Step S124), the operation proceeds to Step S126.

In this example, the threshold frequency value T may be previously determined by default. Alternatively, the threshold frequency value T may be determined based on the resolution of the original image D0. For example, a table shown in FIG. 6, which indicates the correspondence between the resolution R of an original image and a threshold frequency value T, may be stored in a memory of the edge detector 12 of FIG. 1. Using the table of FIG. 6, the edge detector 12 can select a threshold frequency value T according to the resolution R of the original image.

Referring back to FIG. 3, Step S125 generates an edge detection result, which indicates to apply edge enhancement to the original image D0.

Step S126 generates an edge detection result, which indicates not to apply edge enhancement to the original image D0.

Figure 7:
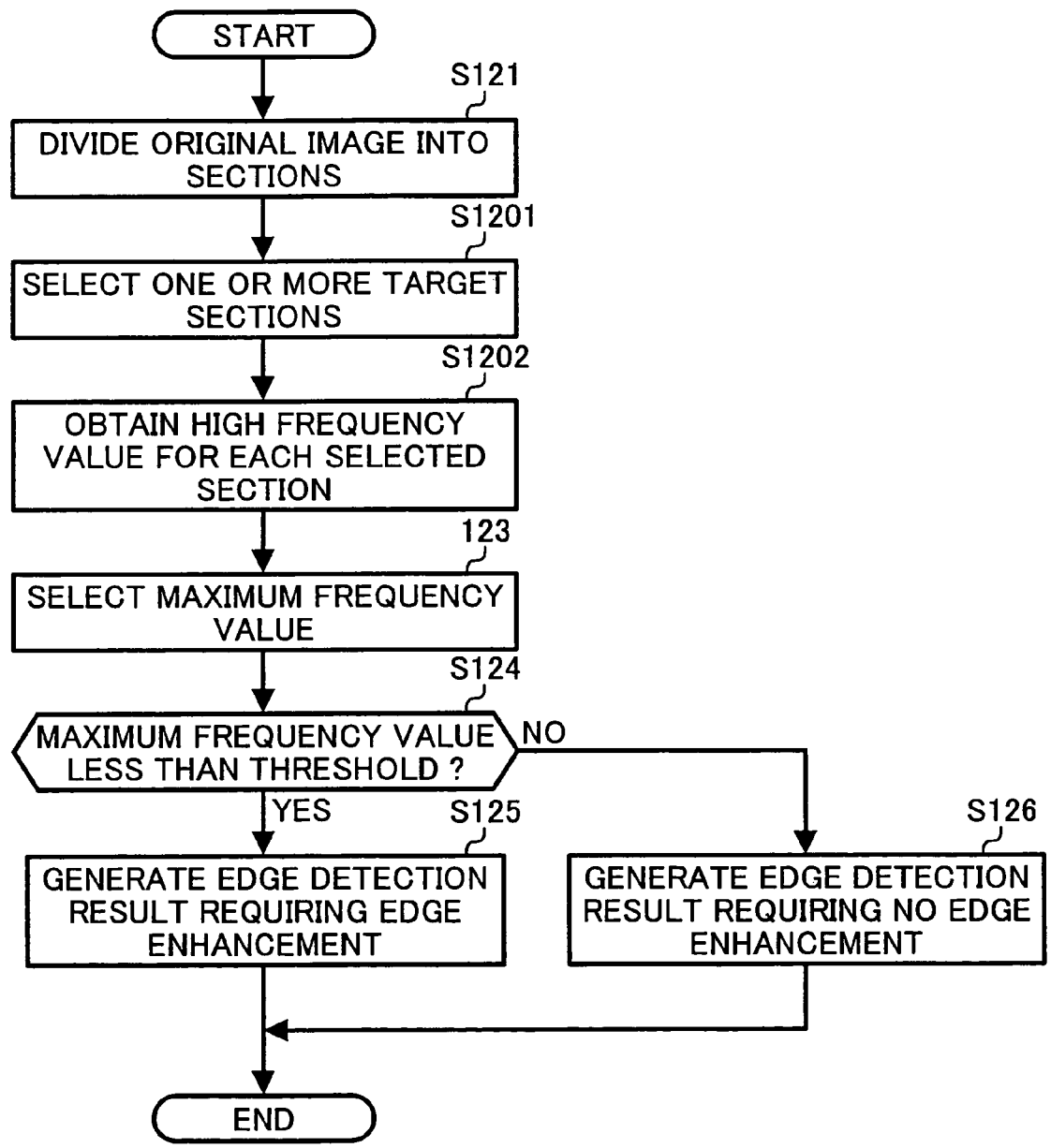
FIG. 7 is a flowchart illustrating generation of an edge detection result according to an exemplary embodiment of the present invention.

Referring now to FIG. 7, Step S12 of generating an edge detection result is explained according to another exemplary embodiment of the present invention. The operation of FIG. 7 is similar to the operation shown in FIG. 3. The differences include replacement of Step S122 with Steps S1201 and S1202.

Figure 8:
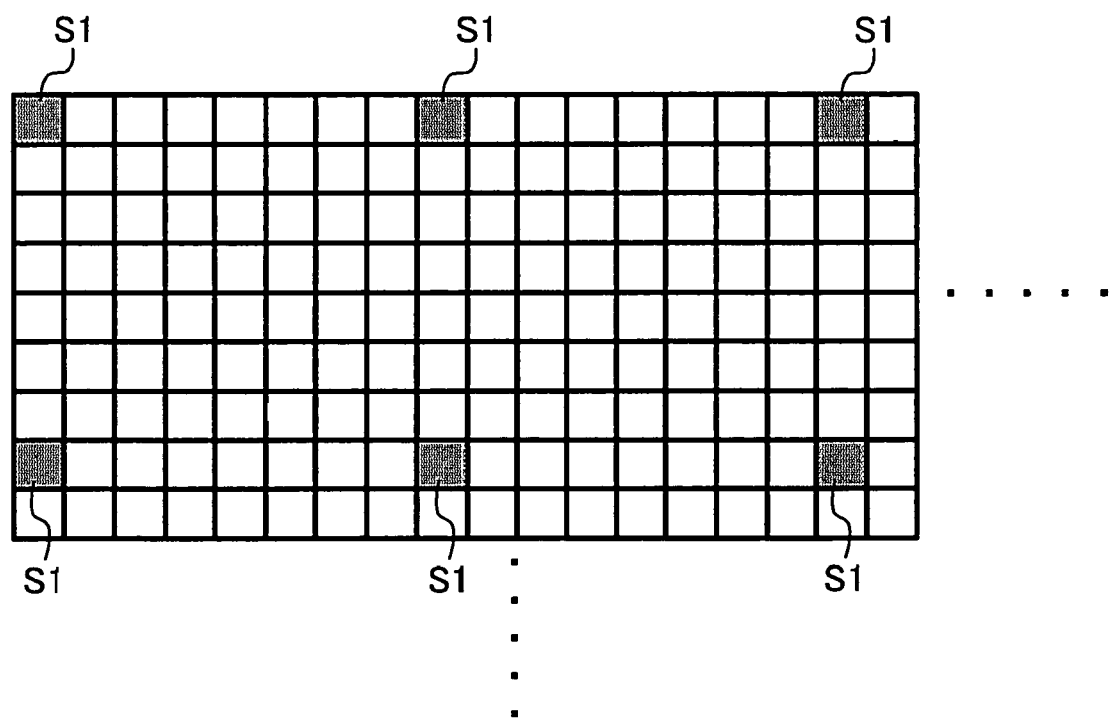
FIG. 8 is an illustration for explaining selection of a section to be processed according to an exemplary embodiment of the present invention.

Step S1201 selects one or more target sections S1 from the plurality of sections S. In this example, only the selected target sections S1 will be subject to further processing. For example, as illustrated in FIG. 8, one out of the eight sections S may be selected as the target section S1 for further processing.

Step S1202 obtains a high frequency value F for each of the selected target sections S1. Since only the selected target sections S1 are processed, the processing time may be reduced.

Figure 9:
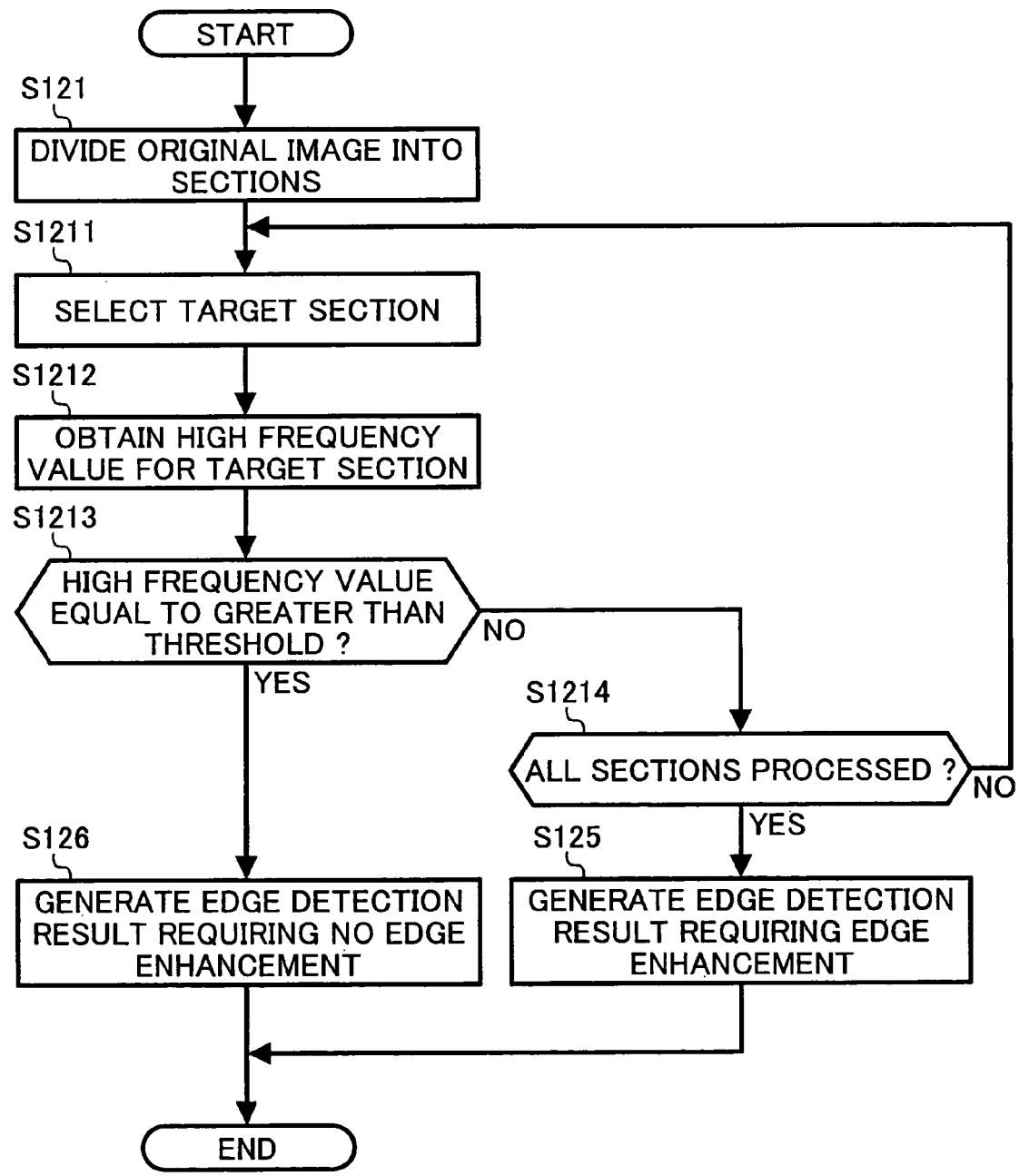
FIG. 9 is a flowchart illustrating generation of an edge detection result according to an exemplary embodiment of the present invention.

Referring now to FIG. 9, Step S12 of generating an edge detection result is explained according to another exemplary embodiment of the present invention. The operation of FIG. 9 is similar to the operation of FIG. 3. The differences include replacement of Steps S122, S123, S124 with Steps S1211, S1212, S1213, and S1214.

Figures 10, 11A, 11B:
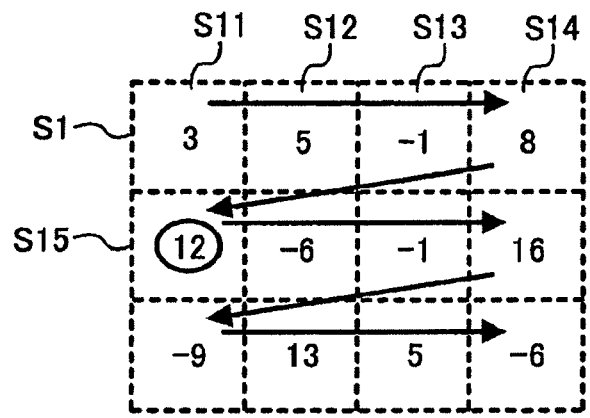
FIG. 10 is an illustration of processing a section according to an exemplary embodiment of the present invention.
FIG. 11A is an illustration of an exemplary edge enhancement filter.
FIG. 11B is an illustration of an exemplary edge enhancement filter.

Step S1211 selects a target section S1 from the plurality of sections S. For example, as illustrated in FIG. 10, a target section S1 may be selected in the order from the top left to the bottom right of the original image.

Step S1212 obtains a high frequency value F for the selected target section S1. In the exemplary embodiment shown in FIG. 10, the edge detector 12 first obtains a high frequency value F for the target section S11 positioned at the top left, which is the value "3".

Step S1213 determines whether the high frequency value F is equal to or greater than a threshold frequency value T. If it is determined that the high frequency value F is equal to or greater than the threshold frequency value T ("YES" in Step S1213), the operation proceeds to Step S126 to generate an edge detection result indicating not to apply edge enhancement. If the high frequency value F is less than the threshold frequency value T ("NO" in Step S1213), the operation proceeds to Step S1214.

Step S1214 determines whether all sections S in the original image have been processed. If all sections S have been processed ("YES" in Step S1214), the operation proceeds to Step S125 to generate an edge detection result indicating to apply edge enhancement. If all sections S have not been processed ("NO" in Step S1214), the operation returns to Step S1211 to select a next target section S1.

In the exemplary embodiment shown in FIG. 10, the edge detector 12 first determines whether the high frequency value 3 for the top left section S11 is equal to or greater than the threshold frequency value T, which is 10 in this example. Since the high frequency value 3 is less than 10 ("NO" in Step S1213), the operation proceeds to Step S1214 to select a next target section S12. This operation is repeated for the section S13, the section S14, and the Section S15.

Since the section S15 has the high frequency value 12, which is greater than 10 ("YES" in Step S1213), the operation proceeds to Step S126 to generate an edge detection result, which indicates not to apply edge enhancement.

According to the operation of FIG. 9, since the edge detection result is generated as soon as the high frequency value F that is equal to or greater than the threshold frequency value T is detected, the processing speed may be reduced.

Referring back to FIG. 2, Step S14 of applying edge enhancement may be performed in various ways. In one example, the image enhancer 13 of FIG. 1 may apply edge enhancement using a spatial filter illustrated in FIG. 11A. Once the spatial filter of FIG. 11A is applied to the original image, the pixel value f of the original image is adjusted as illustrated in the following equation:

$$f'(i,j)=5*f(i,j)-f(i-1,j)-f(i+1,j)-f(i,j-1)-f(i,j+1)$$

wherein f'(i, j) corresponds to the adjusted pixel value.

In another example, the image enhancer 13 of FIG. 1 may apply edge enhancement using more than one spatial filter, which may be selected based on the high frequency value F obtained in Step S12 of FIG. 2.

For example, referring back to FIG. 3, if the target section S has a high frequency value F, which is greater than the value 5, the image enhancer 13 of FIG. 1 may select the spatial filter illustrated in FIG. 11A. If the target section S has a high frequency value F, which is equal to or less than the value 5, the image enhancer 13 of FIG. 1 may select a spatial filter illustrated in FIG. 11B. In this manner, the degree of edge enhancement can be adjusted depending on the characteristics of the original image, such as its edge intensity.

Figure 12:
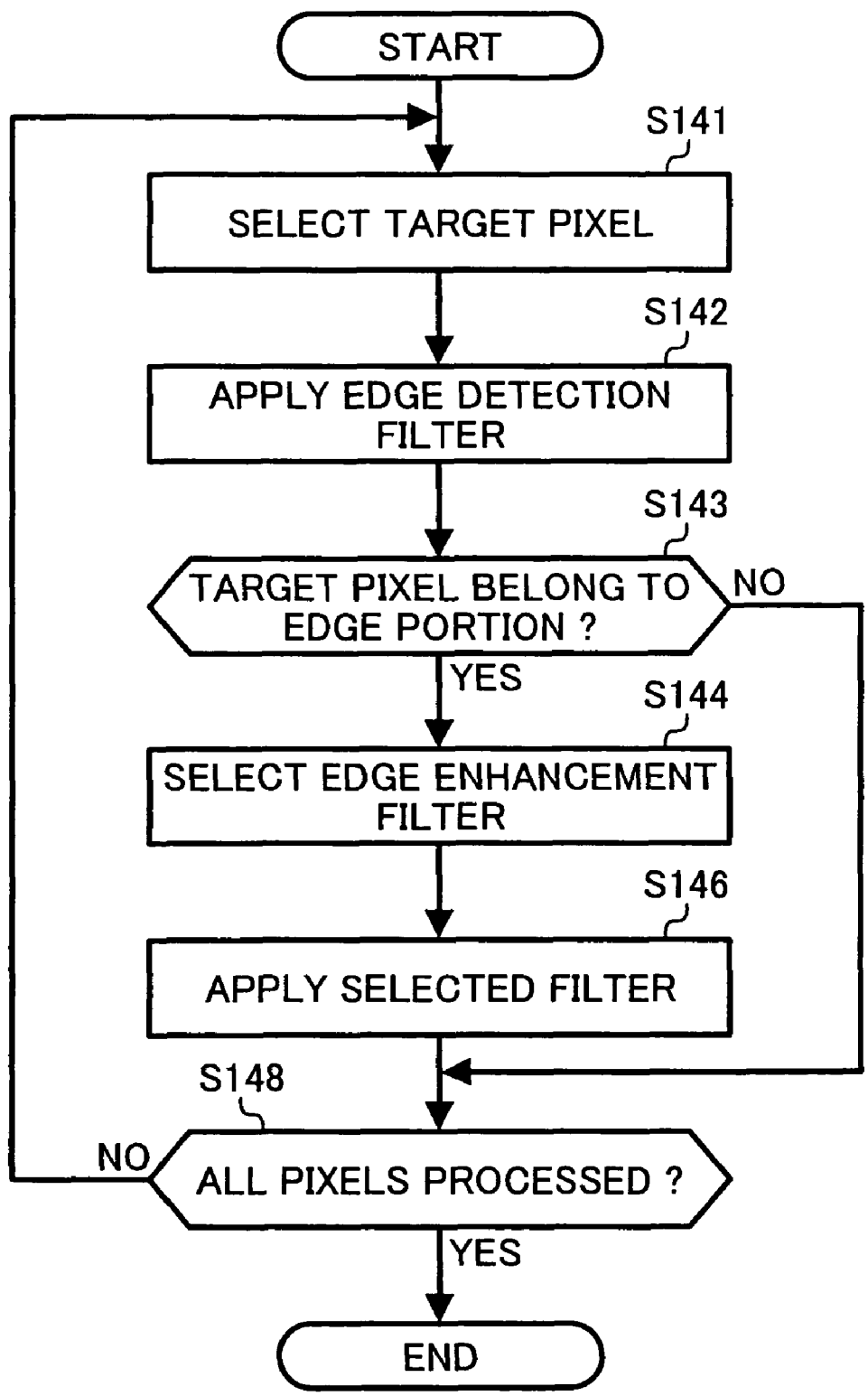
FIG. 12 is a flowchart illustrating the application of edge enhancement according to an exemplary embodiment of the present invention.
Figure 16:
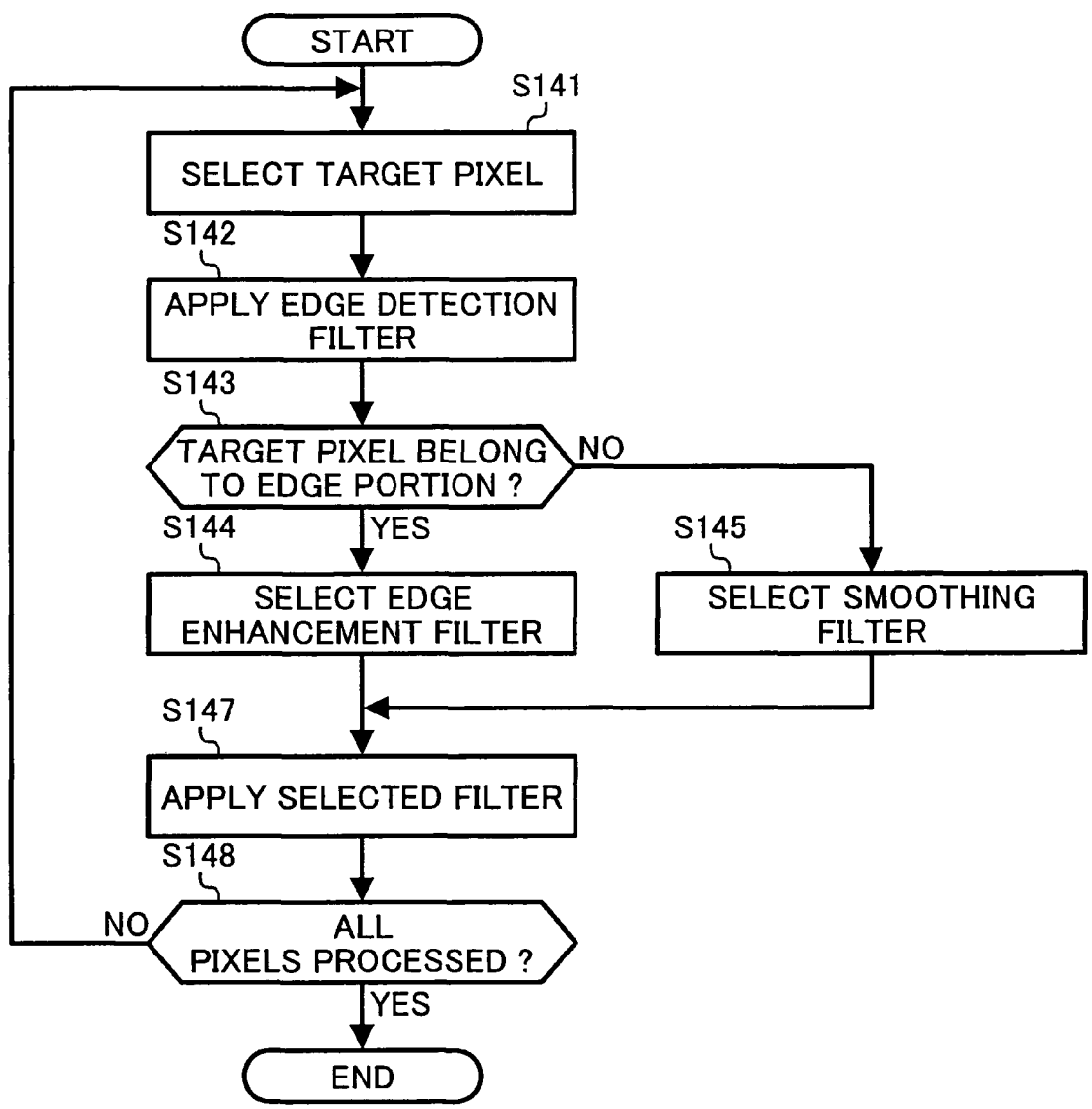
FIG. 16 is a flowchart illustrating the application of edge enhancement according to an exemplary embodiment of the present invention.

Further, in this example, the image enhancer 13 of FIG. 1 may select a spatial filter based on the edge direction of the original image, as illustrated in any one of FIG. 12 and FIG. 16.

Referring now to FIG. 12, Step S14 of applying edge enhancement is explained in more detail according to an exemplary embodiment of the present invention. In this example, the steps illustrated in FIG. 12 are performed by the image enhancer 13 having the structure shown in FIG. 13.

As shown in FIG. 13, the image enhancer 13 includes an edge analyzer 131, a filter selector 132, and an edge enhancer 133. The edge analyzer 131 analyzes the original image to generate an analyzing result indicating an edge portion of the original image and the direction of the edge portion. The filter selector 132 selects a spatial filter based on the analyzing result generated by the edge analyzer 131. The edge enhancer 133 applies edge enhancement to the original image using the spatial filter selected by the filter selector 132, based on the analyzing result.

Referring back to FIG. 12, Step S141 selects a target pixel in the original image. For example, the target pixel may be selected in the order from the top left to the bottom right in the original image.

Step S142 applies an edge detection filter to the target pixel to generate a filtered value, which indicates whether the target pixel belongs to an edge portion of the original image. Further, in this example, a plurality of spatial filters is used to detect the direction of the edge portion that includes the target pixel.

For example, as illustrated in FIGS. 14A to 14D, the edge analyzer 131 applies a first edge detection filter f1, a second edge detection filter f2, a third edge detection filter f3, and a fourth edge detection filter f4, respectively to a target pixel P to generate a first filtered value fv1, a second filtered value fv2, a third filtered value fv3, and a fourth filtered value fv4. The first filtered value fv1 indicates whether the target pixel P belongs to the edge portion in the vertical direction. The second filtered value fv2 indicates whether the target pixel P belongs to the edge portion in the horizontal direction. The third filtered value fv3 indicates whether the target pixel P belongs to the edge portion in a first diagonal (the bottom left to the top right) direction. The fourth filtered value fv4 indicates whether the target pixel P belongs to the edge portion in a second diagonal (the top left to the bottom right) direction.

If the target pixel P has the value 3, for example, and its surrounding pixels have the values 2, 10, 12, 1, 8, 0, 4, and 3 as illustrated in FIG. 14E (collectively referred to as the "pixel values M"), the first filtered value fv1 can be obtained by applying the first edge detection filter f1 to the pixel values M:
$\{2*1+10*1+12*1+1*0+3*0+8*0+0*(-1)+4*(-1)+3*(-1)\}=17$.

Similarly, the second filtered value fv2 can be obtained by applying the second edge detection filter f2 to the pixel values M:
$\{2*1+10*0+12*(-1)+1*1+3*0+8*(-1)+0*1+4*0+3*(-1)\}=20$ Similarly, the third filtered value fv3 can be obtained by applying the third edge detection filter f3 to the pixel values M:
$\{2*0+10*1+12*1+1*(-1)+3*0+8*1+0*(-1)+4*(-1)+3*0\}=25$ Similarly, the fourth filtered value fv4 can be obtained by applying the fourth edge detection filter f4 to the pixel values M:
$\{2*1+10*1+12*0+1*1+3*0+8*(-1)+0*0+4*(-1)+3*(-1)\}=2$.

Step S143 determines whether the target pixel belongs to the edge portion of the original image. If the target pixel belongs to the edge portion ("YES" in Step S143), the operation proceeds to Step S144. If the target pixel does not belong to the edge portion ("NO" in Step S143), the operation proceeds to Step S148.

In this example, the edge analyzer 131 determines whether the target pixel P belongs to the edge portion using the first to fourth filtered values fv1 to fv4 obtained in Step S142. More specifically, in this example, the edge analyzer 131 selects one of the first to fourth filtered values fv1 to fv4, which has the largest value. The edge analyzer 131 then determines whether the largest filtered value is equal to or greater than a threshold filtered value. If the largest filtered value is equal to or greater than the threshold filtered value, the edge analyzer 131 determines that the target pixel P belongs to the edge portion in the direction of the largest filtered value, and the operation proceeds to Step S144. If the largest filtered value is less than the threshold filtered value, the edge analyzer 131 determines that the target pixel P does not belong to the edge portion, and the operation proceeds to Step S148.

Assuming that the threshold filtered value is 20, in the exemplary embodiment illustrated in FIGS. 14A to 14E, the third filtered value fv3 of 25, which is the largest, is compared with the threshold filtered value of 20. Since the third filtered value fv3 is greater than the threshold filtered value, the operation proceeds to Step S144.

Figure 15A:
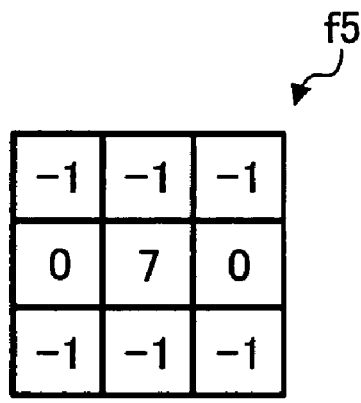
FIG. 15A is an illustration of an exemplary edge enhancement filter for the vertical direction.
Figure 15B:
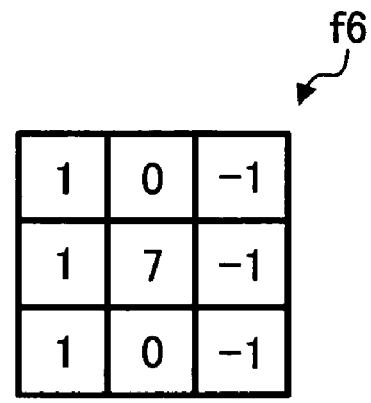
FIG. 15B is an illustration of an exemplary edge enhancement filter for the horizontal direction.
Figure 15C:
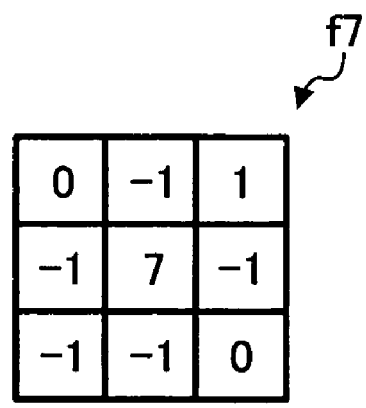
FIG. 15C is an illustration of an exemplary edge enhancement filter for the first diagonal (the bottom left to the top right) direction.
Figure 15D:
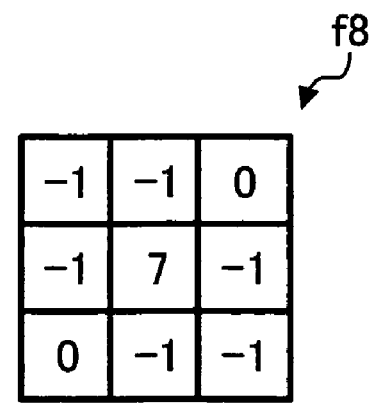
FIG. 15D is an illustration of an exemplary edge enhancement filter for the second diagonal (the top left to the bottom right) direction.

Step S144 selects an edge enhancement filter based on the analyzing result generated by the edge analyzer 131 of FIG. 13. In this example, the filter selector 132 selects a spatial filter corresponding to the direction of the edge portion that includes the target pixel P. For example, if the target pixel P belongs to the edge portion in the vertical direction, an edge enhancement filter for the vertical direction, such as a first edge enhancement filter f5 illustrated in FIG. 15A, is selected. If the target pixel P belongs to the edge portion in the horizontal direction, an edge enhancement filter for the horizontal direction, such as a second edge enhancement filter f6 illustrated in FIG. 15B, is selected. If the target pixel P belongs to the edge portion in the first diagonal (the bottom left to the top right) direction, an edge enhancement filter for the first diagonal direction, such as a third edge enhancement filter f7 illustrated in FIG. 15C, is selected. If the target pixel P belongs to the edge portion in the second diagonal (the top left to the bottom right) direction, an edge enhancement filter for the second diagonal direction, such as a fourth edge enhancement filter f8 illustrated in FIG. 15D, is selected. In the exemplary embodiment illustrated in FIGS. 14A to 14E, since the third filtered value fv3 is the largest, the third edge enhancement filter f7 is selected.

Step S146 applies the selected edge enhancement filter to the target pixel. In the exemplary embodiment illustrated in FIGS. 14A to 14E, the third edge enhancement filter f7 is applied to the pixel values M to enhance the variance in pixel values in the first diagonal direction.

Step S148 determines whether all pixels in the original image have been processed. If all pixels have been processed ("YES" in Step S148), the operation ends. If all pixels have not been processed ("NO" in Step S148), the operation returns to Step S141 to select a next target pixel in the original image.

Referring now to FIG. 16, Step S14 of applying edge enhancement is explained according to another exemplary embodiment of the present invention. In this example, the steps illustrated in FIG. 16 are performed by the image enhancer 13 having the structure shown in FIG. 17.

Figure 17:
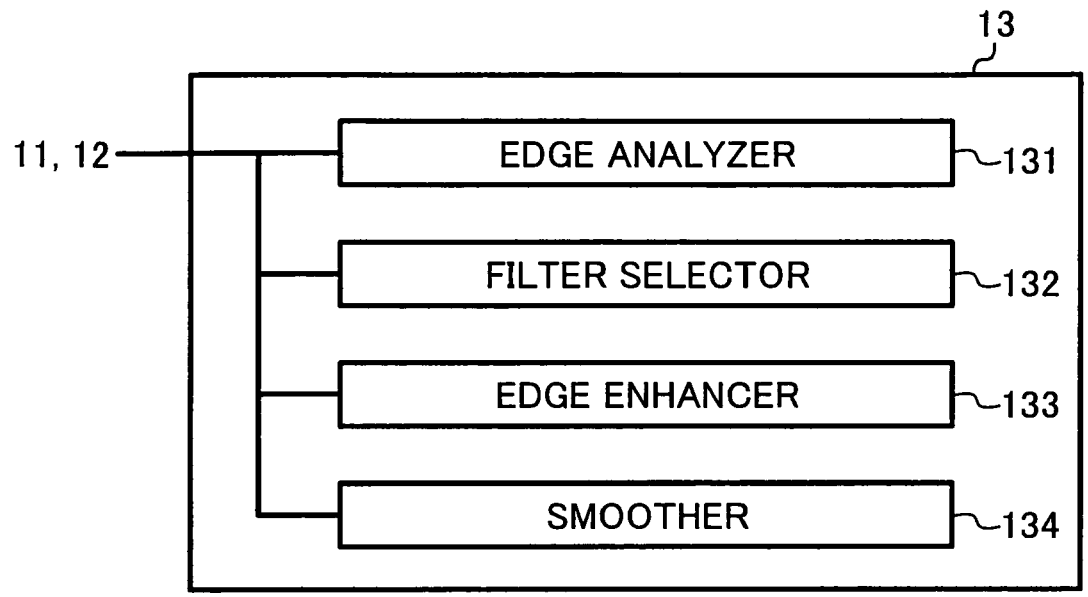
FIG. 17 is the functional structure of an edge enhancer shown in FIG. 1 according to an exemplary embodiment of the present invention.

As shown in FIG. 17, the image enhancer 13 includes the edge analyzer 131, the filter selector 132, the edge enhancer 133, and a smoother 134. The edge analyzer 131 analyzes the original image to generate an analyzing result indicating an edge portion of the original image and the direction of the edge portion. In this example, the analyzing result may further indicates a portion other than the edge portion of the original image as a non-edge portion. The filter selector 132 selects a spatial filter based on the analyzing result generated by the edge analyzer 131. The edge enhancer 133 applies edge enhancement to the edge portion of the original image, using the spatial filter selected by the filter selector 132. The smoother 134 applies smoothing to the non-edge portion, using the spatial filter selected by the filter selector 132.

Referring back to FIG. 16, Step S141 selects a target pixel in the original image.

Step S142 applies an edge detection filter to the target pixel to generate a plurality of filtered values in a similar manner as Step S142 of FIG. 12.

Step S143 determines whether the target pixel belongs to the edge portion of the original image. If the target pixel belongs to the edge portion ("YES" in Step S143), the operation proceeds to Step S144. If the target pixel does not belong to the edge portion ("NO" in Step S143), the operation proceeds to Step S145.

Step S144 selects an edge enhancement filter in a similar manner as Step S144 of FIG. 12.

Step S145 selects a smoothing filter based on the analyzing result generated by the edge analyzer 131 of FIG. 17. In this example, the filter selector 132 selects a spatial filter for smoothing the pixel value of the target pixel. In this manner, moiré or noise in the image may be suppressed.

Step S147 applies the selected filter to the target pixel. In this example, if the edge enhancement filter is selected in Step S144, the edge enhancer 133 of FIG. 17 applies edge enhancement to the target pixel using the edge enhancement filter selected in Step S144. If the smoothing filter is selected in Step S145, the smoother 134 of FIG. 17 applies smoothing to the target pixel using the smoothing filter selected in Step S145.

Step S148 determines whether all pixels in the original image have been processed. If all pixels have been processed ("YES" in Step S148), the operation ends. If all pixels have not been processed ("NO" in Step S148), the operation returns to Step S141 to select a next target pixel in the original image.

The image processing apparatus 10 of FIG. 1 may be implemented in various ways. For example, the image processing apparatus 10 may be combined with other components as illustrated in any one of FIG. 18 and FIG. 20. Further, any one of the original image input 11, the edge detector 12, and the image enhancer 13 may operate independently, or they may be combined together into one component. Furthermore, the image processing apparatus 10 may be implemented by any kind of image processing system, for example, as a multifunctional apparatus (MFP) 100 shown in FIG. 23.

Figure 18:
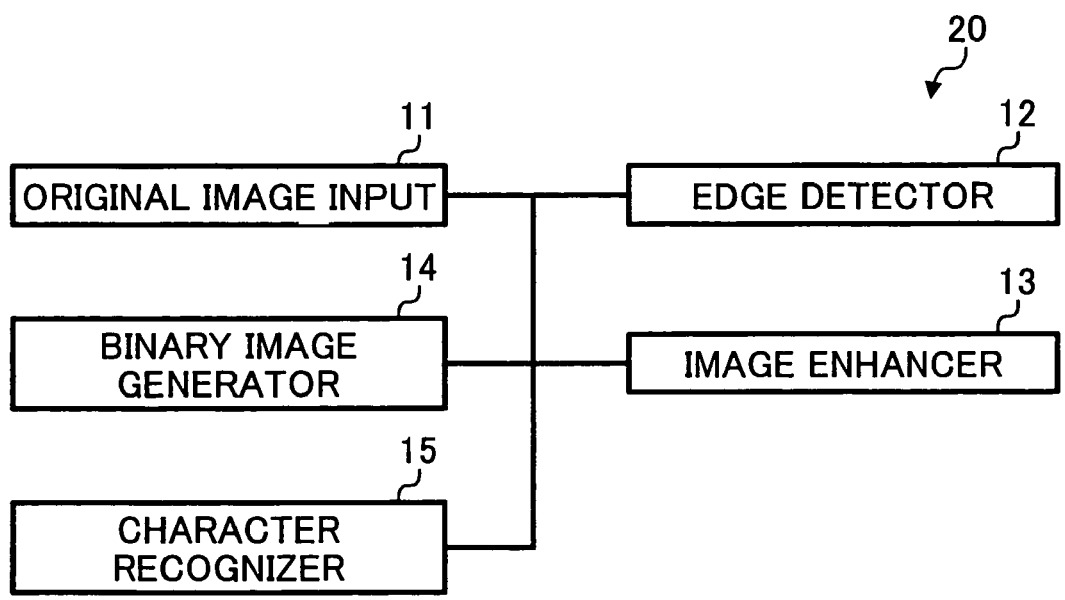
FIG. 18 is the functional structure of an image processing apparatus according to an exemplary embodiment of the present invention.

Referring now to FIG. 18, an image processing apparatus 20 is explained according to an exemplary embodiment of the present invention. The image processing apparatus 20 of FIG. 18 is similar in functional structure to the image processing apparatus 10 of FIG. 1, except for the addition of a binary image generator 14 and a character recognizer 15. The image processing apparatus 20 is capable of extracting a character portion of an original image, as illustrated in FIG. 19, for example.

Figure 19:
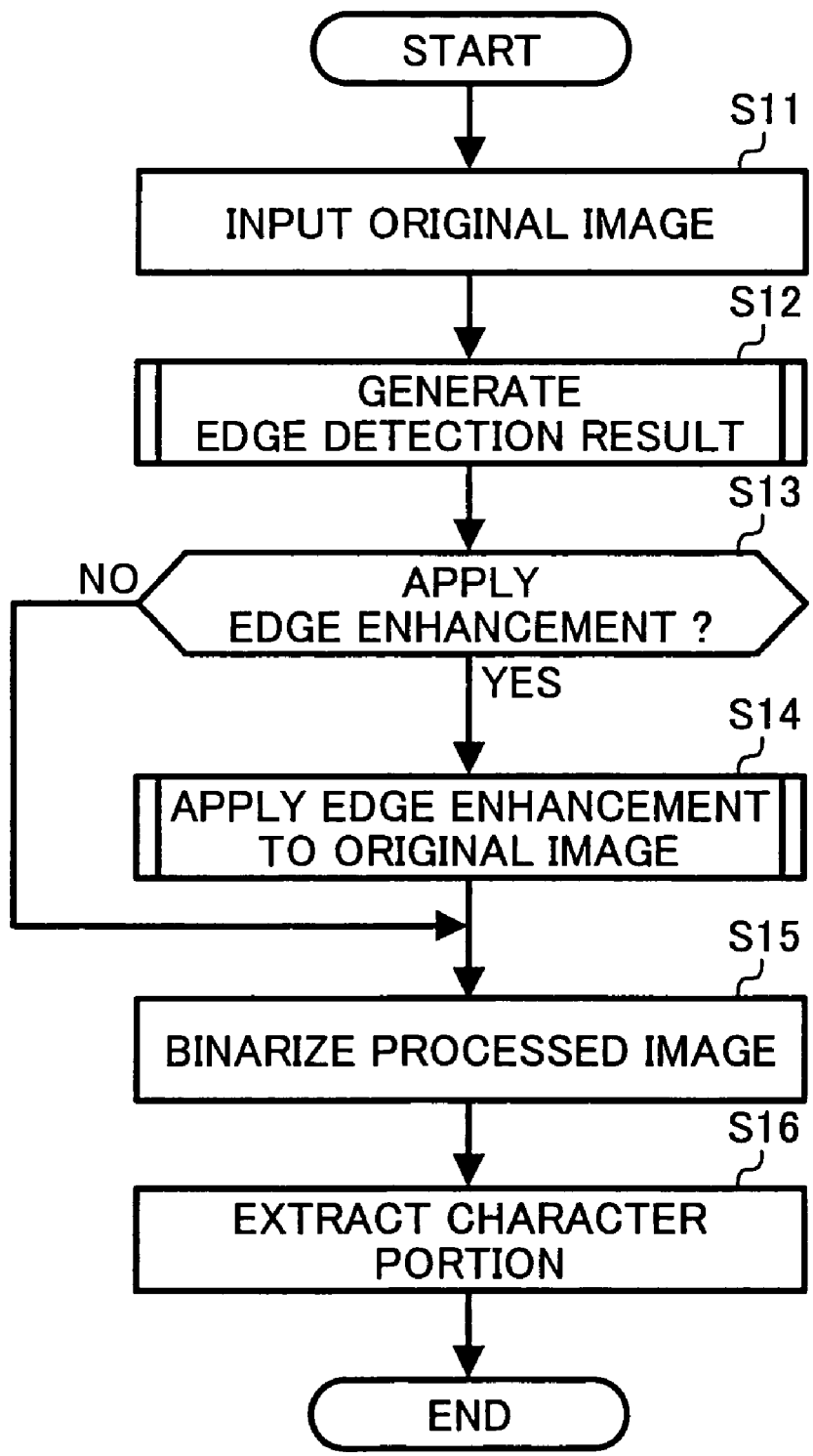
FIG. 19 is a flowchart illustrating the extraction of a character portion of an original image, according to an exemplary embodiment of the present invention.

Referring to FIG. 19, Steps S11 to S14 are performed in a similar manner as Steps S11 to S14 of FIG. 2.

In Step S15, the binary image generator 14 generates a binary image from a processed image, which has been generated by the image enhancer 13 of FIG. 18, using any kind of binarization method.

In Step S16, the character recognizer 15 extracts a character portion from the binary image, using any kind of character recognition method. Since the binary image is generated based on the processed image having the enhanced image quality as compared to the original image, the character portion can be extracted more accurately.

Figure 20:
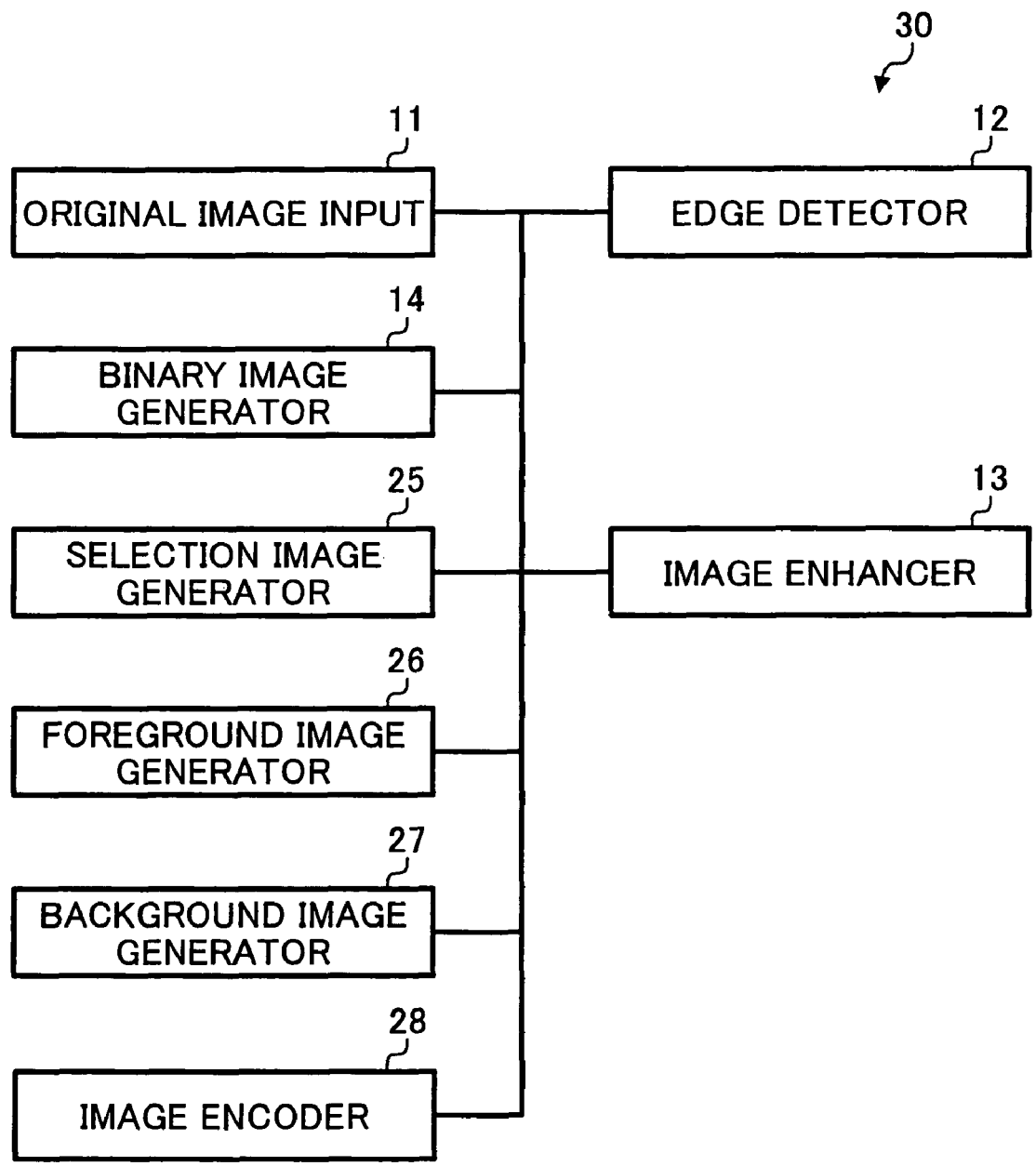
FIG. 20 is the functional structure of an image processing apparatus according to an exemplary embodiment of the present invention.

Referring now to FIG. 20, an image processing apparatus 30 is explained according to an exemplary embodiment of the present invention. The image processing apparatus 30 of FIG. 20 is similar in functional structure to the image processing apparatus 10 of FIG. 1, except for the addition of the binary image generator 14, a selection image generator 25, a foreground image generator 26, a background image generator 27, and an image encoder 28. The image processing apparatus 30 is capable of encoding an original image, as illustrated in FIG. 21, for example.

Figure 21:
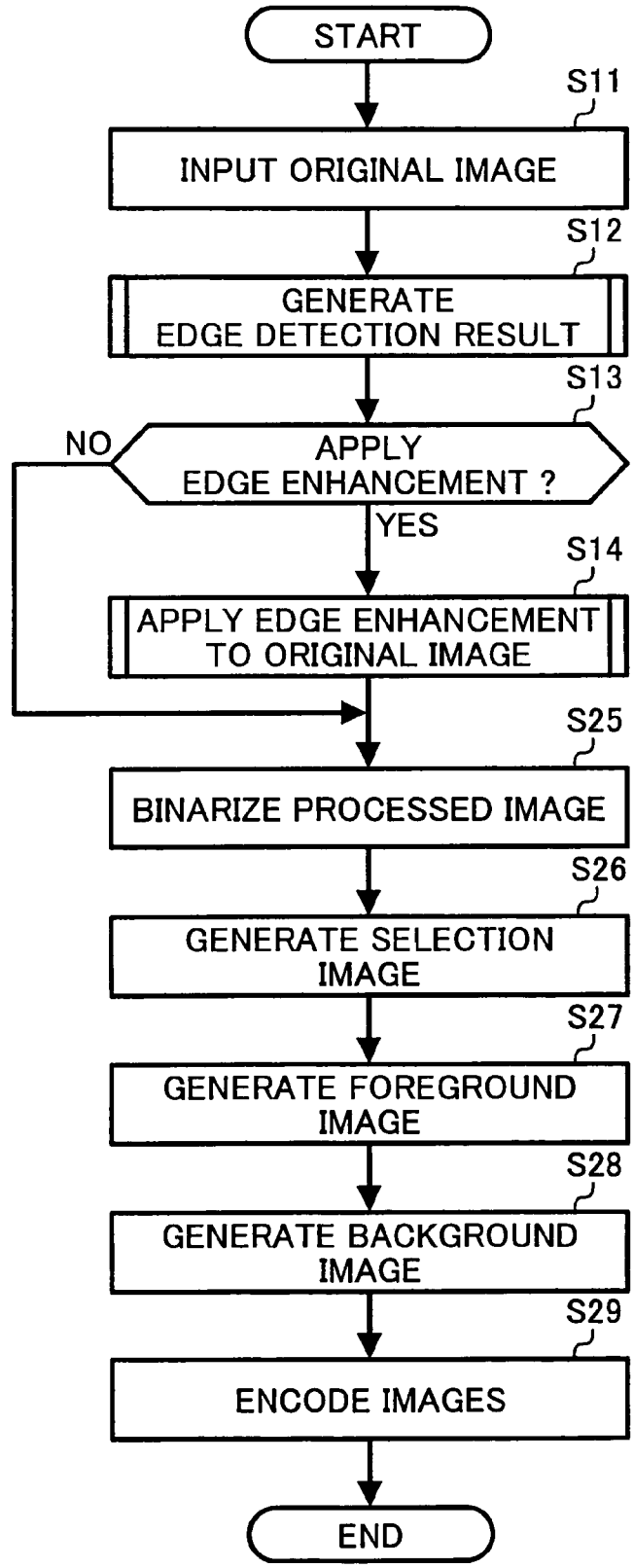
FIG. 21 is a flowchart illustrating the encoding of an original image according to an exemplary embodiment of the present invention.

Referring to FIG. 21, Steps S11 to S14 are performed in a similar manner as Steps S11 to S14 of FIG. 2.

In Step S25, the binary image generator 14 generates a binary image from a processed image, which has been generated by the image enhancer 13 of FIG. 20, using any kind of binarization method.

In Step S26, the selection image generator 25 generates a selection image, which may be used to segment the original image into a foreground image and a background image. For example, the selection image generator 25 extracts a character portion from the binary image using any kind of character recognition method. Once the character portion is extracted, the selection image generator 25 removes the unextracted portion, i.e., the non-character portion of the binary image, for example by making the pixel values of the unextracted portion to become 0 or transparent. The resultant image is referred to as the selection image.

Figure 22:
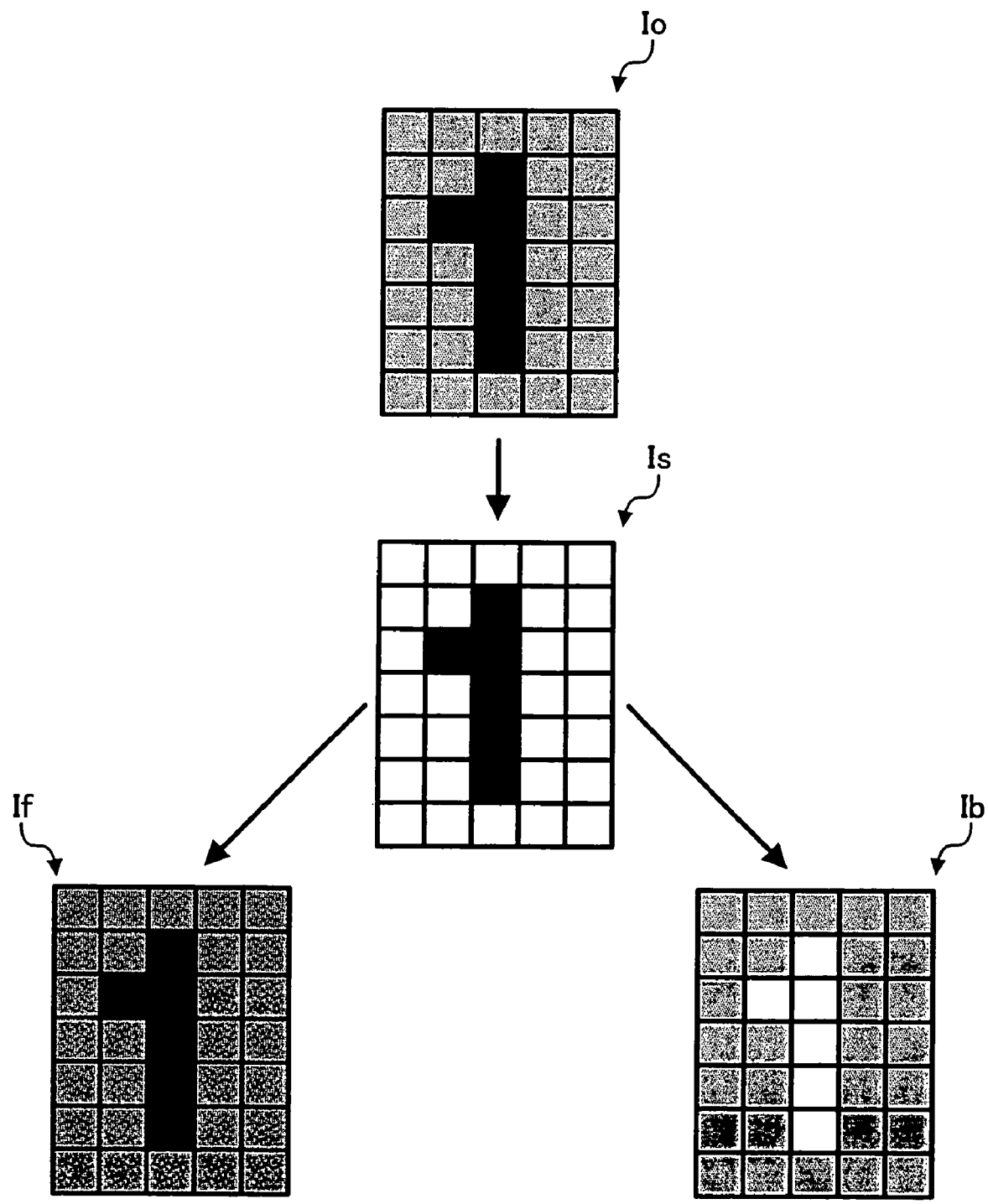
FIG. 22 is a diagram of the operation shown in FIG. 21 according to an exemplary embodiment of the present invention.

In Step S27, the foreground image generator 26 generates the foreground image from the original image, using the selection image. For example, as illustrated in FIG. 22, if an original image I0 and a selection image Is are provided, the foreground image generator 26 generates a foreground image If in the following manner. The foreground image generator 26 determines whether a target pixel in the foreground image If belongs to the character portion using the selection image Is. If the target pixel belongs to the character portion, the foreground image generator 26 assigns the pixel value, which can be obtained from the original image I0, to the target pixel. If the target pixel does not belong to the character portion, the foreground image generator 26 assigns the target pixel with the pixel value, which has been previously determined, such as the value corresponding to the black color, for example.

In Step S28, the background image generator 27 generates the background image from the original image, using the selection image. In the exemplary embodiment illustrated in FIG. 22, the background image generator 27 generates a background image Ib in the following manner. The background image generator 27 determines whether a target pixel in the background image Ib belongs to the non-character portion using the selection image Is. If the target pixel belongs to the non-character portion, the background image generator 27 assigns the pixel value, which can be obtained from the original image I0, to the target pixel. If the target pixel does not belong to the non-character portion, the background image generator 27 assigns the target pixel with the previously determined pixel value, e.g., the value corresponding to the white color.

In Step S29, the image encoder 28 encodes the foreground image and the background image, respectively. For example, the foreground image may be encoded using the MMR compression method, while the background image may be encoded using the JPEG method.

The foreground image, the background image, and the selection image may be stored in a corresponding manner for further use. Alternatively, the foreground image, the background image, and the selection image may be combined together using the JPEG 2000 multilayer (JPM) method for display, for example.

Figure 23:
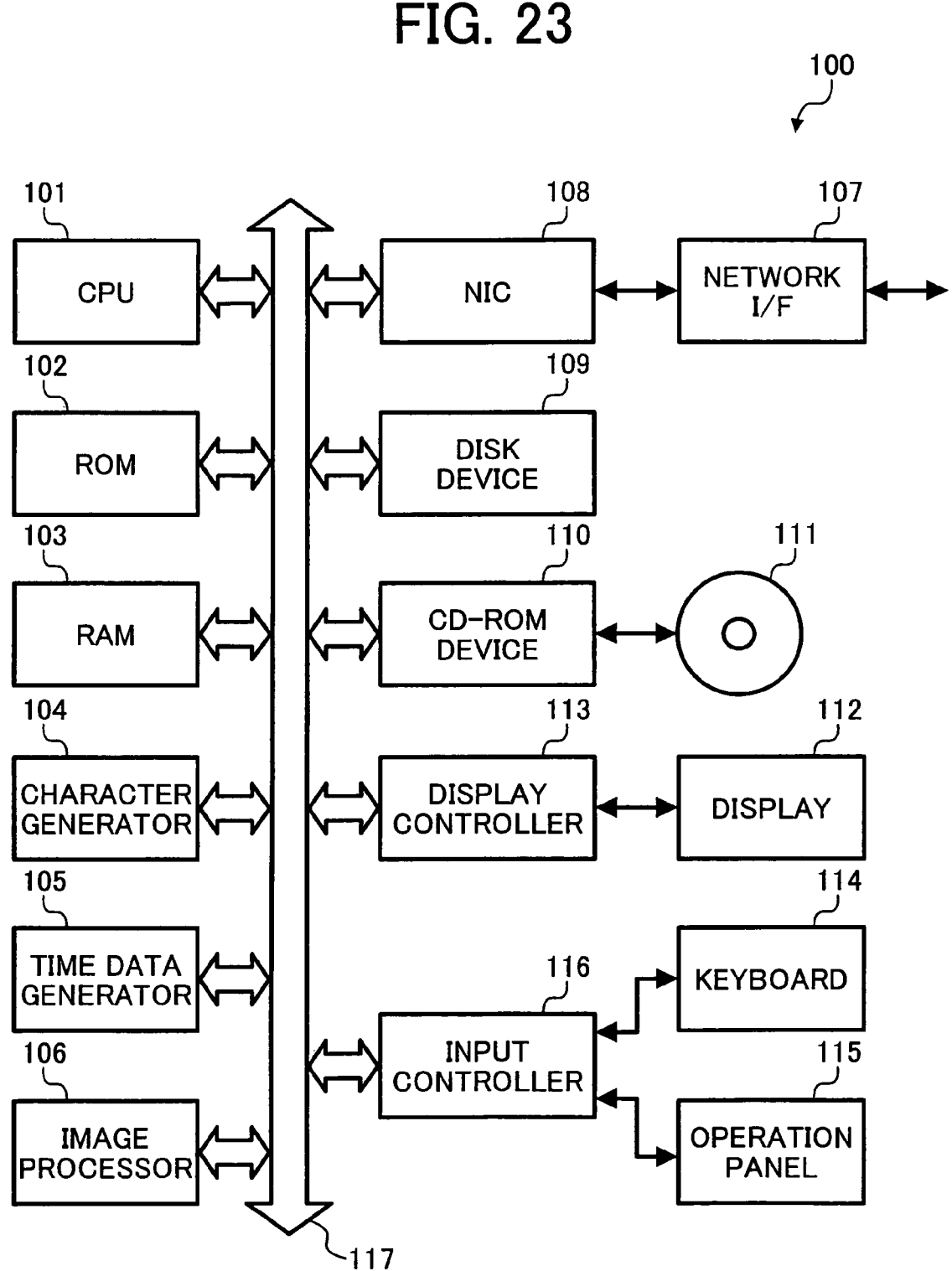
FIG. 23 is the hardware structure of an image processing apparatus according to an exemplary embodiment of the present invention.

Referring now to FIG. 23, the structure of the MFP 100 is explained according to an exemplary embodiment of the present invention.

As shown in FIG. 23, the MFP 100 includes a central processing unit (CPU) 101, a read only memory (ROM) 102, a random access memory (RAM) 103, a character generator 104, a time data generator 105, an image processor 106, a network interface (I/F) 107, a network interface controller (NIC) 108, a disk device 109, a CD-ROM device 110, a display 112, a display controller 113, a keyboard 114, an operation panel 115, and an input controller 116, which are connected via a bus 117.

The CPU 101 controls operation of MFP 100. The ROM 102 stores various data, such as various computer programs to be executed by the CPU 101. The RAM 103 functions as a work memory of the CPU 101.

The character generator 104 generates character data, which may be displayed by the display 112. The time data generator 105 outputs a current time or date, for example. The image processor 106 performs various image processing, such as edge enhancement or smoothing, for example.

The network I/F 107 connects the MFP 100 to a network, such as a local area network or the Internet. The NIC 108 controls network connection, such as various communication protocols, to allow the MFP 100 to communicate via the network.

The disk device 109 stores various data, such as various application programs, work data, file data, image data, etc. The CD-ROM 110 reads out data from a removable medium, such as an optical disc 111. The display 112 displays various data, which relates to the operation of the MFP 100. The display controller 113 controls data to be displayed by the display 112. The keyboard 114 allows a user to input various data, such as numerical or character data, for example. The operation panel 115 allows the user to input various data, using various keys or buttons, for example. The input controller 116 inputs data received from the user through the keyboard 114 or the operation panel 115.

In one example, an image processing program of the present invention may be stored in the ROM 102. Upon execution, the CPU 101 may load the image processing program to operate as any one of the image processing apparatuses 10, 20, and 30. Alternatively, the image processing program may be downloaded from the network via the network I/F 107. Further, the image processing program may be uploaded to the network to cause another apparatus to operate as any one of the image processing apparatuses 10, 20, and 30.

Numerous additional modifications and variations are possible in light of the above disclosure. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, cassette tapes, involatile memory cards, optical memory cards, ROM (read-only-memory), involatile memory, etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. An image processing method, comprising the steps of:
inputting an original image;
dividing an entirety of the original image into a plurality of sections;
converting the original image from a spatial domain to a frequency domain to obtain a high frequency value for at least one of the plurality of sections;
analyzing the high frequency value to generate an analyzing result;
determining whether to apply edge enhancement to the entirety of the original image based on the analyzing result to generate an edge detection result; and
applying edge enhancement to the original image based on the edge detection result to produce a processed image,
wherein the analyzing step comprises the steps of:
obtaining a plurality of high frequency values corresponding to each one of the plurality of sections;
selecting a maximum frequency value from the plurality of high frequency values; and
determining whether the maximum frequency value is less than a threshold frequency value.

2. The method of claim 1, wherein the edge detection result indicates to apply edge enhancement when the determining step determines that the maximum frequency value is less than the threshold frequency value.

3. The method of claim 2, wherein the threshold frequency value is determined in a corresponding manner with a resolution of the original image.

4. An image processing method, comprising the steps of:
inputting an original image;
determining whether an edge enhancement is required for an entirety of the original image;
if an edge enhancement is required, performing the steps of analyzing the original image to generate an analyzing result indicating an edge portion and a direction of the edge portion, selecting a filter based on the analyzing result, and enhancing the original image to generate a processed image using the filter selected by the selecting step, based on the analyzing result;
if an edge enhancement is not required, no further edge enhancement processing is conducted;
generating a binary image from the processed image if edge enhancement is required or from the original image if edge enhancement is not required;
generating a selection image from the binary image;
segmenting the original image into a foreground image and a background image, using information obtained from the selection image and the original image; and
encoding the foreground image and the background image respectively.

* * * * *